United States Patent
Petrak

(10) Patent No.: US 10,442,031 B2
(45) Date of Patent: Oct. 15, 2019

(54) OPTIMIZATION OF THE ACTIVATION OF ADHESIVE AGENTS BY LASER RADIATION

(71) Applicant: Homag GmbH, Schopfloch (DE)

(72) Inventor: Axel Petrak, Horb a. N. (DE)

(73) Assignee: HOMAG GMBH, Schopfloch (DE)

( * ) Notice: Subject to any disclaimer, the term of this patent is extended or adjusted under 35 U.S.C. 154(b) by 144 days.

(21) Appl. No.: 15/489,934

(22) Filed: Apr. 18, 2017

(65) Prior Publication Data

US 2017/0216963 A1 Aug. 3, 2017

Related U.S. Application Data

(62) Division of application No. 14/377,911, filed as application No. PCT/EP2013/052290 on Feb. 6, 2013, now abandoned.

(30) Foreign Application Priority Data

Feb. 10, 2012 (DE) .................. 10 2012 202 020

(51) Int. Cl.

| | | |
|---|---|---|
| B32B 37/12 | (2006.01) | |
| B23K 26/00 | (2014.01) | |
| B27D 5/00 | (2006.01) | |
| B29C 63/00 | (2006.01) | |
| B23K 1/005 | (2006.01) | |

(Continued)

(52) U.S. Cl.
CPC ........ *B23K 26/0006* (2013.01); *B23K 1/0056* (2013.01); *B23K 26/035* (2015.10); *B23K 26/08* (2013.01); *B23K 26/20* (2013.01); *B23K 26/702* (2015.10); *B27D 5/003* (2013.01); *B29C 63/003* (2013.01); *B29C 63/0065* (2013.01); *B32B 37/10* (2013.01); *B32B 37/1207* (2013.01); *B29C 65/1619* (2013.01); *B29C 65/1632* (2013.01); *B29C 65/1658* (2013.01); *B29C 65/1674* (2013.01); *B29C 65/48* (2013.01); *B29C 66/112* (2013.01); *B29C 66/114* (2013.01); *B29C 66/472* (2013.01); *B29C 66/83411* (2013.01); *B32B 2037/1253* (2013.01); *B32B 2310/0843* (2013.01)

(58) Field of Classification Search
CPC .............. B23K 26/0006; B23K 26/035; B23K 26/702; B23K 26/08; B23K 26/20; B23K 1/0056; B27D 5/003; B29C 63/003; B29C 63/0065; B32B 37/10; B32B 37/1207

See application file for complete search history.

(56) References Cited

FOREIGN PATENT DOCUMENTS

| DE | 3827297 A1 * | 2/1990 | ......... B23K 26/0846 |
|---|---|---|---|
| EP | 1800813 A2 * | 6/2007 | ............... B27D 1/00 |
| EP | 1852242 A1 * | 11/2007 | ......... B29C 63/0026 |

OTHER PUBLICATIONS

Machine Translation of DE-3827297-A1 (Year: 1990).*
Machine Translation of EP-1800813-A2 (Year: 2007).*
Machine Translation of EP-1852242-A1 (Year: 2007).*

* cited by examiner

*Primary Examiner* — Daniel McNally
(74) *Attorney, Agent, or Firm* — Scott R. Cox

(57) ABSTRACT

The present invention relates to devices with which, for example, narrow surfaces of preferably plate-like workpieces can be provided with a coating material. The device includes a laser for outputting a laser beam to a laser beam emitter, wherein the laser beam is directed onto the coating material or onto the workpiece in such a manner that the laser beam forms a plane of reference with solder on the surface of the coating material or the workpiece.

9 Claims, 3 Drawing Sheets

(51) Int. Cl.
*B32B 37/10* (2006.01)
*B23K 26/035* (2014.01)
*B23K 26/70* (2014.01)
*B23K 26/08* (2014.01)
*B23K 26/20* (2014.01)
*B29C 65/16* (2006.01)
*B29C 65/48* (2006.01)
*B29C 65/00* (2006.01)

US 10,442,031 B2

OPTIMIZATION OF THE ACTIVATION OF ADHESIVE AGENTS BY LASER RADIATION

CROSS-REFERENCE TO RELATED APPLICATIONS

This application is a divisional application based on U.S. application Ser. No. 14/377,911, filed Aug. 11, 2014, which was filed as a 371 U.S. National Stage of International Application No. PCT/EP2013/052290, filed Feb. 6, 2013, and claims priority to German patent application no. 10 2012 202 020.9, filed Feb. 10, 2012, the disclosures of which are herein incorporated by reference in their entirety.

TECHNICAL FIELD

The present invention relates to devices with which, for example, narrow surfaces of preferably plate-like workpieces can be provided with a coating material. In this field, laser devices for activating the adhesive agent already provided on the coating material or on the workpiece are known.

PRIOR ART

For instance, DE 10 2006 056 010 A1 is to be cited as prior art. This document discloses a method for coating components of wood, wood-based materials, plastic or the like, in which a solid coating is applied onto a surface of the component, the component and the solid coating being moved relative to each other and being connected by means of an adhesive in the area of the pressure zone. The adhesive and/or the solid coating and/or the component is activated or reactivated in the area of a reaction zone by irradiation with at least one laser beam, and subsequently the solid coating is connected with the component by means of a pressure element.

In the prior art, e.g. several lasers with mixed polarization are used, the laser beams of which are subsequently combined and directed to the adhesive agent to be activated. Systems in which the laser beams are guided via glass fiber cables are also known.

In this regard, it has turned out to be disadvantageous that in part there is an enhanced reflection of the laser beam when coupling the radiation into the adhesive agent to be activated.

THE SUBJECT MATTER OF THE INVENTION

It is an object of the present invention to provide an activation device for a coating device, with which a high degree of efficiency is achieved in the activation of the adhesive agent, as well as a reduction of the scattered radiation that might be dangerous, but is at least reducing efficiency.

The object according to the invention is solved by a device according to claim 1. Further preferred embodiments are apparent from the dependent claims.

The core of the invention is the use of the laser, with which a polarized laser beam can be emitted in such a manner that in a plane of reference to the adhesive agent essentially a laser beam with p-polarization is provided. P-polarization means in this context "parallel polarization" in relation to a plane of reference perpendicular to the surface formed by the coating material or the workpiece, and which is set up by drawing a perpendicular to this surface and the laser beam. S-polarization means "perpendicular polarization" in relation to the plane of reference.

Within the terms of this application, coating material designates an element applied onto a workpiece. This can consist of one material or of a plurality of layers. For instance, an adhesive agent to be activated is applied as the top layer. Otherwise, it is possible to activate a material having a plastic layer by the laser beam. Accordingly, "on a coating material" means in relation to the adhesive agent within the terms of this application both an adhesive agent layer on or at the coating material or also adhesive agents in the coating material. In this case, the adhesive agent is integrated in the coating material or, alternatively, the coating material itself can unfold adhesive properties. Furthermore, a coextruded material is to be mentioned.

Filtering a multi-polar laser light, which results in a reduction of the originally generated laser power, is not absolutely necessary in this regard. However, the laser beam could also be filtered additionally.

According to the present invention, a device for activating an adhesive agent is provided, said device having: a laser for outputting the laser beam to a laser beam emitter and a movement device for moving the coating material relative to a laser light emitter. The laser beam is directed to the coating material or the workpiece in such a manner that the laser beam forms a plane of reference (E) perpendicular to the surface of the coating material or the workpiece. The laser beam has more p-polarized light than s-polarized light in the plane of reference (E).

The laser beam emitted by the laser beam emitter is oriented such that it can impact the adhesive agent and activate it. In the activated state, the adhesive agent can provide a permanent connection between the workpiece and the coating material.

In the course of the tests carried out it has been shown that coupling a laser beam with p-polarization into an adhesive agent results in a significant reduction of the radiation reflected at the adhesive agent. Thus, it is possible to use a laser with lower intensity while maintaining the activation energy necessary for activation, and thus to achieve energy savings owing to reduced power as compared to known systems. Furthermore, a higher process stability as well as a lower proneness to installation/mounting tolerances can be realized.

Preferably, it is provided that more than 75% of p-polarized light is present in said plane of reference or that almost exclusively p-polarized light is present in said plane of reference. As compared to laser light with mixed polarization or light with s-polarization, p-polarized light is characterized in that the laser power converted into the adhesive agent assumes higher values.

In a preferred embodiment, it is provided that a deflection mirror or prism is used for deflecting the laser beam. As compared to fiber conductors, these measures are characterized in that the polarization output by the laser is maintained. Consequently, the laser light can be coupled into the adhesive agent to be activated without an additional filter. Additional filtering of light portions including s-polarized light despite said measures could nevertheless be provided. It is particularly preferred in this regard that the light of the laser beam is direct radiation.

In a preferred embodiment of the present invention, the laser beam is directed to the coating material or onto the workpiece in such a manner that the laser beam forms an angle of 15-35°, preferably of 20-30°, and even more preferably of 20-27° with the plane of the coating material or the plane of the workpiece. In said angle ranges, an optimum of the incidence angle of the laser beam and the optical penetration depth into the adhesive agent to be activated results. Furthermore, in this area the reflection of light of the laser beam is minimized. In combination with the polarization according to the claim of the light of the laser beam a high efficiency thus results.

In a preferred embodiment, the laser emits a laser beam with only a particular polarization. This can be a diode laser, fiber laser, solid state laser or $CO_2$ laser.

Furthermore, the present invention can also be directed not only at a device, but also at a method for activating an adhesive agent.

DETAILED DESCRIPTION OF THE PREFERRED EMBODIMENTS

Figure 1:
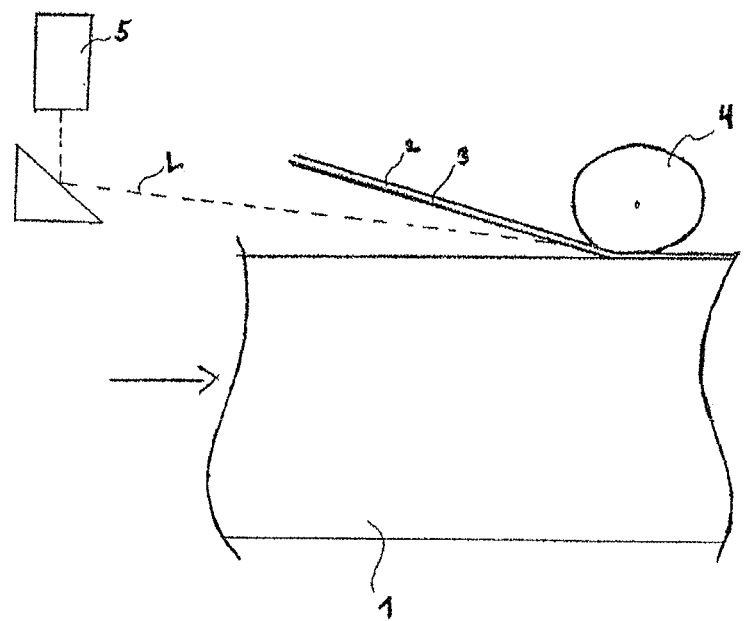
FIG. 1 is a schematic plan view showing a portion of a coating device

FIG. 1 shows a schematic view of a preferred embodiment of the present invention. The shown elements are highly simplified in order to be able to illustrate the core of the present invention more clearly.

In particular, a workpiece 1 is illustrated that moves in a traveling direction through the coating device (see arrow in FIG. 1). A coating material 2 is pressed onto the workpiece 1 by means of a pressure roller 4, said coating material 2 being provided with an adhesive agent on the side facing the workpiece 1.

Furthermore, a diode laser 5 is provided in the present embodiment, which emits a laser beam L and deflects said laser beam via a schematically illustrated mirror or prism 6 into the area of the reaction zone. Alternatively, fiber lasers or $CO_2$ lasers are also suited for this use. In this regard, it is preferably provided that the laser beam L impacts the plane of the coating material at an angle α of 20-30°. This preferred angle results from the refractive index of air (approximately 1) and the value of 1.5 typical of plastics such as the adhesive agent.

According to the invention it is provided that the laser 5 oriented such that p-polarization is predominant in the plane of reference of the adhesive agent 3. The assessment that laser light with p-polarization is "predominant" is associated with the use of a diode laser having a particular polarization. This polarization particular to the diode laser is not lost since mirrors and prisms are used to deflect the laser light to the adhesive agent. If a glass fiber cable were to be used alternatively, the polarization of the laser light emitted by the diode laser would be lost owing to refraction/scattering. However, it may be that despite said procedure a certain refraction/scattering or polarization shift of the laser light cannot be avoided.

The conversion of laser power into heat energy depends not only on the incidence angle of the laser radiation, but also on the optical penetration depth into the adhesive agent to be activated. To achieve a fast and, at the same time, uniform activation it has been shown that an optimum penetration depth of approximately 0.4 mm is to be chosen.

Since the laser beam is oriented such that p-polarization is predominant in the plane of reference and the path of the laser beam through the adhesive means is maximized by the choice of the incidence angle, an optimal coupling of the energy of the laser beam into the adhesive agent can be used for the activation thereof.

Figure 2:
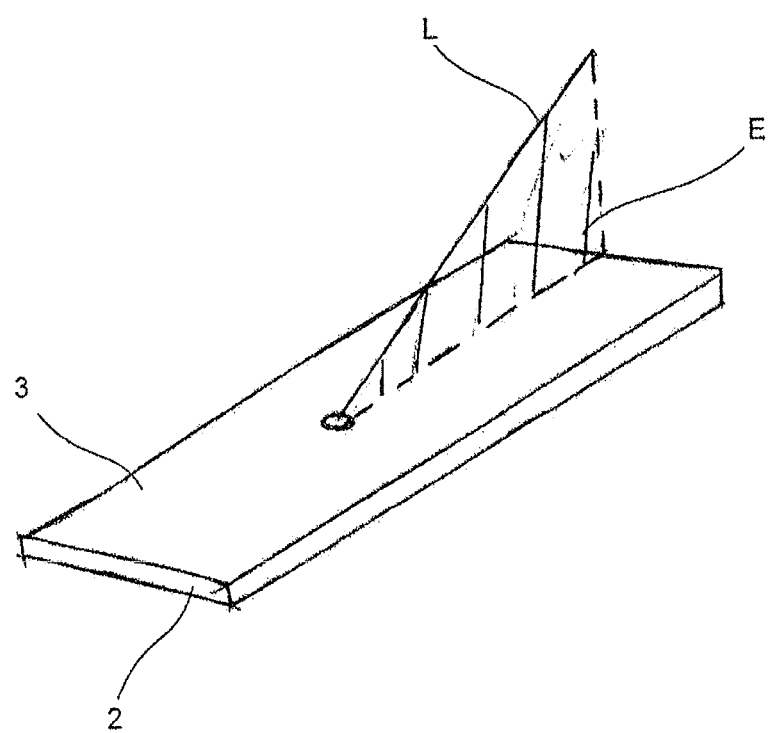
FIG. 2 is a schematic perspective view illustrating the incidence angle of the laser beam on an edge band

In FIG. 2, a coating material 2 is shown schematically, onto which is applied an adhesive agent 3 to be activated. Furthermore, a laser beam L is shown which forms a plane of reference E perpendicular to the plane of the coating material.

Figure 3:
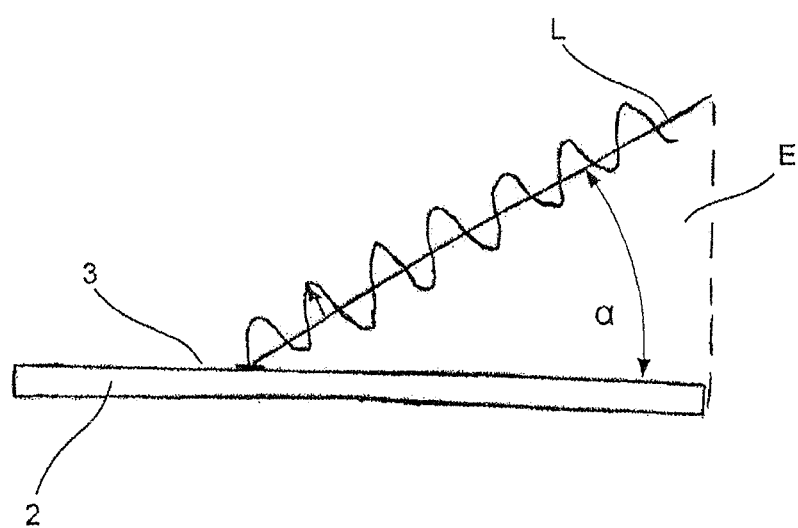
FIG. 3 is a view illustrating the polarization direction of the laser light

In FIG. 3, the preferred polarization of the laser light is illustrated clearly in a schematic side view: the amplitude of the laser light beam L oscillates in the above-defined plane of reference and impacts the coating material 2 at an incidence angle α.

The tests carried out within the framework of this invention have shown that the maximum converted power of the laser with the here preferred p-polarization of the laser light is approximately 20-30° maximum. In this angle range, there is firstly a low refraction of the laser light at the adhesive agent. Secondly, an even heat penetration of the adhesive agent is achieved.

The characteristic values for laser light with mixed polarization, which is usually used, moreover exhibit a lower converted laser power as compared to laser light with p-polarization. This applies in particular with regard to the angle range, in which a low refraction of the laser light can be expected.

The invention claimed is:

1. A method for activating an adhesive agent provided on a coating material of a workpiece, comprising
    using a movement device to move the coating material or workpiece;
    outputting a laser beam from a laser to a laser beam emitter,
    directing the laser beam to the coating material or the workpiece such that the laser beam forms a plane of reference perpendicular to a surface of the coating material or the workpiece,
    utilizing more p-polarized light than s-polarized light in the plane of reference within the laser beam;
    activating the adhesive agent provided on the coating material with the laser beam,
    and pressing the coating material with a pressure roller onto the workpiece after activation of the adhesive agent, wherein the laser beam forms an angle of 20°-30° in respect to a plane of the coating material or the workpiece.

2. The method according to claim 1, characterized in that more than 75% of p-polarized light is present in the plane of reference.

3. The method according to claim 1, characterized in that almost exclusively p-polarized light is present in the plane of reference.

4. The method according to claim 1, wherein the method further comprises using a deflection mirror or prism to deflect the laser beam.

5. The method according to claim 1, characterized in that the light of the laser beam comprises direct radiation.

6. The method according to claim 1, characterized in that the laser emits a laser beam with only a particular polarization and wherein the laser is selected from the group consisting of a diode laser, a fiber laser, a $CO_2$ laser and a solid state laser.

7. The method according to claim 1, further comprising a movement device for moving the workpiece.

8. The method according to claim 1, wherein the laser beam forms an angle from 20-27° with the plane of the coating material or the workpiece.

9. The method according to claim 1, wherein the coating material with the adhesive agent comprises a coextruded material.

\* \* \* \* \*